United States Patent [19]

Hampson

[11] Patent Number: 5,414,255
[45] Date of Patent: May 9, 1995

[54] INTRUSION DETECTOR HAVING A GENERALLY PLANAR FRESNEL LENS PROVIDED ON A PLANAR MIRROR SURFACE

[75] Inventor: John G. Hampson, High Wycombe, England

[73] Assignee: Scantronic Limited, Greenford, England

[21] Appl. No.: 148,362

[22] Filed: Nov. 8, 1993

[51] Int. Cl.⁶ ............................................. G01V 9/04
[52] U.S. Cl. ........................... 250/221; 250/353; 340/567
[58] Field of Search ............... 250/221, 561, 342, 353; 340/567; 359/356, 742

[56] References Cited

U.S. PATENT DOCUMENTS

| | | |
|---|---|---|
| 3,631,434 | 12/1971 | Schwartz . |
| 3,703,718 | 11/1972 | Berman . |
| 3,971,939 | 7/1976 | Andressen ........................ 250/342 |
| 4,364,030 | 12/1982 | Rossin . |
| 4,429,224 | 1/1984 | Wagli et al. . |
| 4,442,359 | 4/1984 | Lederer . |
| 4,523,095 | 6/1985 | Keller-Steinbach . |
| 4,703,171 | 10/1987 | Kahl et al. . |
| 4,752,769 | 6/1988 | Knaup et al. . |
| 4,841,284 | 6/1989 | Biersdorff . |
| 4,873,469 | 10/1989 | Young et al. . |
| 5,066,855 | 11/1991 | Lee ........................................ 250/342 |
| 5,083,025 | 1/1992 | Blomberg . |
| 5,089,704 | 2/1992 | Perkins ................................. 250/342 |

FOREIGN PATENT DOCUMENTS

| | | |
|---|---|---|
| 0177130 | 4/1986 | European Pat. Off. . |
| 0219954 | 4/1987 | European Pat. Off. . |
| 2178532 | 2/1987 | United Kingdom . |

*Primary Examiner*—David C. Nelms
*Assistant Examiner*—Que T. Le
*Attorney, Agent, or Firm*—Laubscher & Laubscher

[57] ABSTRACT

In an intrusion detector, one or more surveillance zones are imaged using an optical system including a mirror surface and a lens spaced within a small distance of one another and, preferably, in contact. In use, radiation received from said surveillance zone(s) passes through the lens, is reflected from the mirror, re-traverses the lens and falls on a sensing element. In preferred embodiments of the invention the lens is a Fresnel lens and is arranged to create look-down zones for a detector which also monitors forward, side and/or upward surveillance zones.

17 Claims, 4 Drawing Sheets

BY LENSMAKERS FORMULA $$\frac{1}{F_E} = \frac{1}{F_L} + \frac{1}{F_L}$$

So $F_E = \frac{1}{2} F_L$ (HOUSING 3 OMITTED FOR CLARITY)

INTRUSION DETECTOR HAVING A GENERALLY PLANAR FRESNEL LENS PROVIDED ON A PLANAR MIRROR SURFACE

BACKGROUND OF THE INVENTION

1. Field of the Invention

The present invention relates to intrusion detectors and, more particularly, to such detectors having a surveillance zone below the detector (often termed a "look-down" facility).

2. Description of Prior Art

It has become more and more common for intrusion detectors to be designed as zoned devices, i.e. devices adapted to detect the presence, or movement, of an intruder in one or more designated areas (zones) within a monitored space. In general, the plurality of surveillance zones is obtained using optical arrangements including lenses and/or mirrors. See, for example, U.S. Pat. No. 3,703,718 (Berman); U.S. Pat. No. 4,364,030 (Rossin); U.S. Pat. No. 4,429,224 (Wagli et al); U.S. Pat. No. 4,442,359 (Lederer); U.S. Pat. No. 4,523,095 (Keller-Steinbach); U.S. Pat. No. 4,703,171 (Kahl et al); U.S. Pat. No. 4,873,469 (Young et al); British Patent Application 2178532 (Racal-Guardall (Scotland) Ltd.); and European Patent Application 0177130 (Matsushita Electric Works, Ltd.).

The majority of zoned detectors are designed to be ceiling or wall mounted. Early detectors sensed presence in zones and/or movement in or between zones in the same horizontal plane as the detector or in planes tilted downwards at a shallow angle. This means that the surveillance zones were relatively far away from the detector and that areas close to or directly underneath the detector were not covered. More recently, detectors have been designed to incorporate a look-down facility, i.e. to include one or more surveillance zones below or close to the detector, usually in addition to the normal forward/side zones. Examples of detection devices incorporating a look-down facility are described in U.S. Pat. No. 3,631,434 (Schwartz); U.S. Pat. No. 4,752,769 (Knaup et al); U.S. Pat. No. 4,841,284 (Biersdorff); U.S. Pat. No. 5,083,025 (Bloberg) and European patent application 0177130 (Maximal Electrical Engineers Limited).

In the prior art intrusion detectors having a look-down facility, the look-down zone(s) have been produced in various ways. One technique uses a curvilinear mirror located above the sensing element to reflect radiation received from below and to focus it onto the sensing element (U.S. Pat. No. 4,841,284). Another technique uses a lens below the sensing element to focus radiation received from below onto a plane mirror located above the sensing element; the mirror reflects the focussed radiation onto the sensing element (U.S. Pat. No. 5,083,025). Yet another technique makes additional use of a lens already involved in imaging the far zones, and uses it in combination with a mirror spaced above the lens, the mirror being either inside or outside the detector housing (U.S. Pat. Nos. 3,631,434, 4,752,769, EP-A-0219954).

All of the known techniques for providing a look-down facility have disadvantages. The curvilinear mirror approach provides a single look-down zone of narrow aperture. Techniques using combinations of a spaced mirror and lens can provide a plurality of look-down zones if the lens is a Fresnel lens. However, the lens is required to have a short focal length and, preferably, a wide aperture, which is difficult to achieve when using typical Fresnel lenses.

SUMMARY OF THE INVENTION

The present invention provides an intrusion detector for detecting presence of an intruder in one or more zones within a monitored space or movement of said intruder in or between said zones, the intrusion detector comprising a sensing element and an optical system for reflecting and focussing radiation from one or more of said zones onto the sensing element, the optical system comprising a mirror and a lens within a small distance of one another and arranged such that, in use, said radiation passes through the lens, is reflected from the mirror, returns through the lens and then impinges upon the sensing element.

According to the intrusion detector of the present invention, radiation received from one or more surveillance zones passes through a lens twice before being received by a sensing element. The double passage through the lens is equivalent to a single passage through a lens of half focal length. This point is illustrated in FIGS. 1A and 1B.

In preferred embodiments of the invention the lens through which received radiation travels twice is a Fresnel lens providing a number of surveillance zones. The Fresnel lens arranged as in the present invention acts as the optical equivalent of a Fresnel lens of half focal length which, as mentioned above, would be difficult to manufacture.

In intrusion detectors according to the present invention the lens through which radiation travels twice should be close to the associated mirror surface or, preferably, should touch that surface. In particularly preferred embodiments of the invention a planar mirror is used, with a substantially-planar Fresnel lens either formed integrally with the mirror or else held in contact with the mirror for example using a clamp at the edges of the mirror/lens or using adhesive.

In specially preferred embodiments of the invention, the optical system incorporating the mirror and the lens through which radiation travels twice is used to provide one or more look-down zones in addition to forward or side zones provided by other means. However, in principle there is no reason why the optical system could not be used to view side, forward or upward zones, either on its own or in association with other means for viewing other zones.

DESCRIPTION OF THE PREFERRED EMBODIMENTS

Figure 1A:
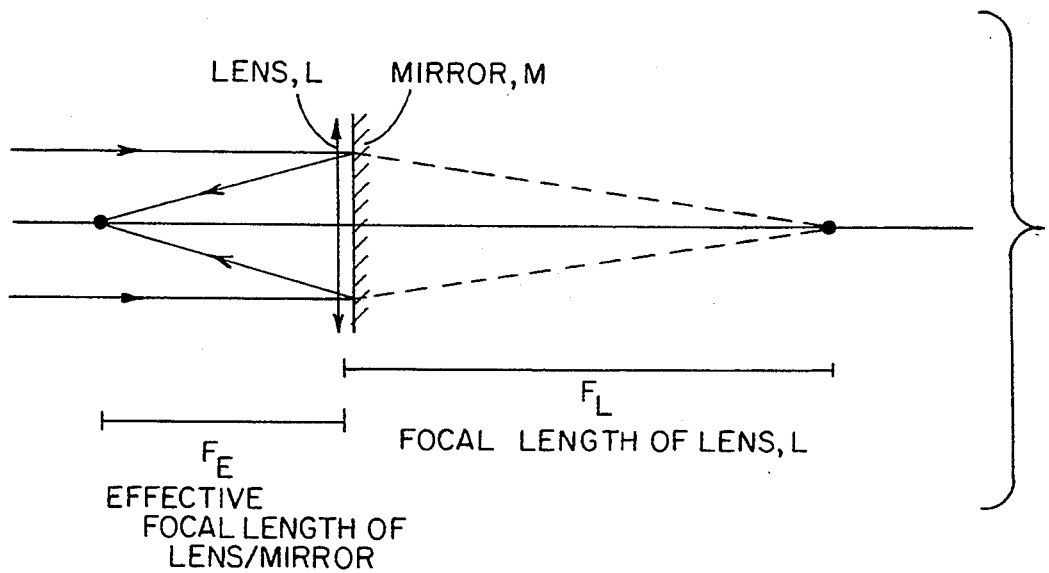
FIGS. 1A and 1B are diagrams illustrating how a lens/mirror combination can be optically equivalent to a lens of half focal length.
Figure 1B:
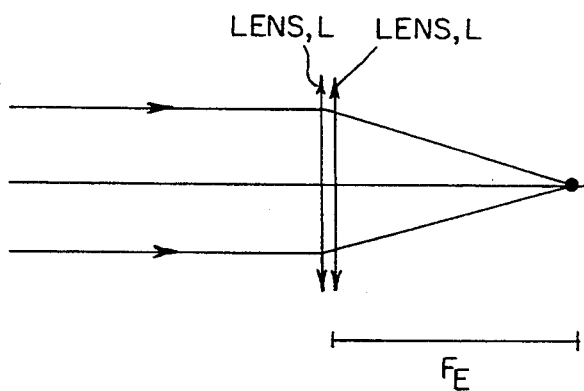
Figure 2A:
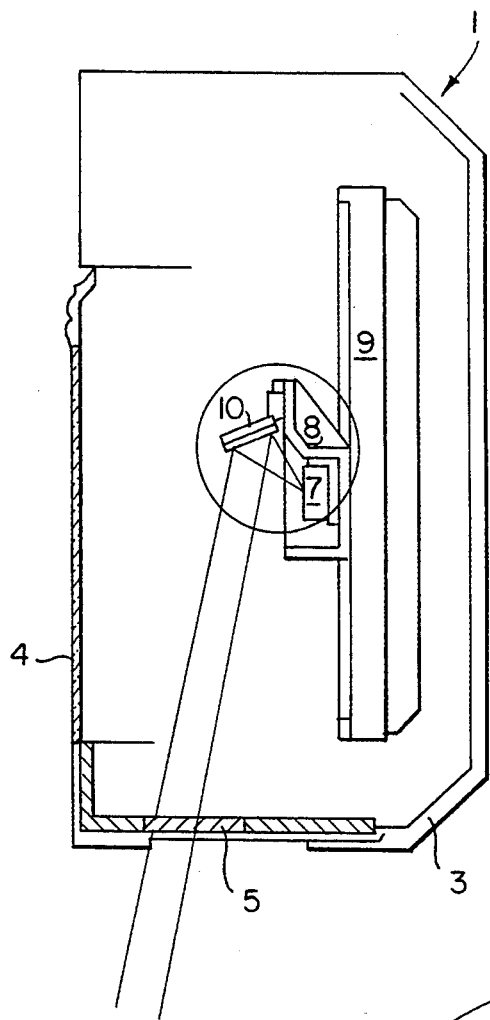
FIG. 2A is a cross-sectional view of an intrusion detector according to a first embodiment of the invention.
Figure 2B:
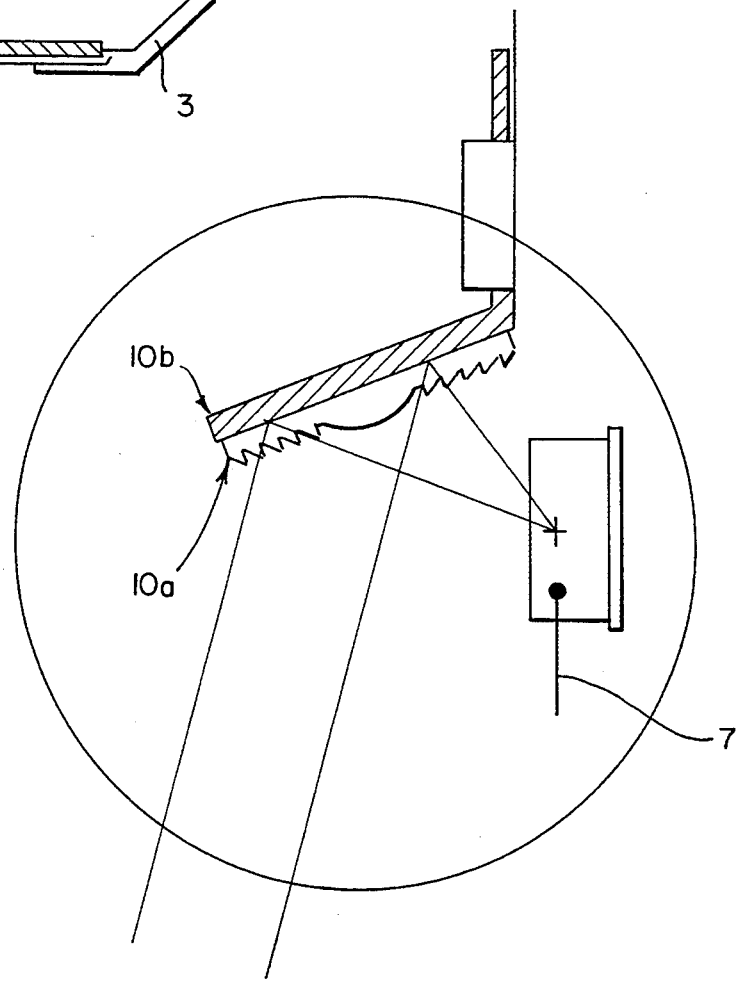
FIG. 2B is a detailed view of the optical system of FIG. 2A.

FIGS. 2A and 2B show an intrusion detector 1 according to a first embodiment of the present invention. The detector 1 is provided with a housing 3 in the form of a box of generally rectangular section having an aperture in a front wall and an aperture in a base wall thereof. A window 4 is provided in the front aperture of the detector housing 3, the window being made of synthetic plastic material conditioned to form a plurality of Fresnel lenses. The Fresnel lenses define a plurality of forward surveillance zones. A screen 5 is provided in the base aperture of the detector housing 3 so as to prevent the ingress of dust and the like into the housing. The thickness and material of the screen 5 are chosen such that radiation of a desired frequency range, in this example infrared radiation, can pass through it.

A sensing element 7 is mounted within the detector housing 3, on one arm of an L-section carrier plate 8, and is arranged such that the sensing element 7 is at the focal point of the various Fresnel lenses of window 4. In this embodiment of the invention the sensing element 7 is a passive infrared sensor (PIR) of conventional construction. Conventional electronic components 9 for processing the output from the PIR 7 may be mounted on the carrier plate 8 also. An optical element 10 is provided within the detector housing 3 and may conveniently be mounted on the other arm of the L-section carrier plate 8. The carrier plate 8 is disposed within the housing 3 such that the PIR 7 is between the optical element 10 and the screen 5 in the base aperture of the housing 3. The optical element 10 is arranged to receive radiation from a number of surveillance zones below or close to the detector, through the screen 5, and to direct this received radiation onto the PIR 7.

Optical element 10 comprises a planar Fresnel lens 10a provided on a mirror surface 10a. These elements are seen more clearly in FIG. 2B). The optical element 10 is arranged so that radiation entering the housing through screen 5 falls on and passes through the Fresnel lens 10a, is reflected from mirror surface 10b, re-traverses Fresnel lens 10a and is focussed onto the PIR 7. The optical element 10 preferably is pivotally mounted so that the zones it monitors can be adjusted. Optical element 10 may be fabricated very simply and cheaply by combining a polished metal or plated synthetic plastic mirror surface with a conventional Fresnel lens formed of synthetic plastic material. A protective layer transparent to infrared radiation may be provided on the surface of the Fresnel lens remote from the mirror surface. The optical element has a wide aperture equal to the full area of the lens 10a/mirror 10b.

Figure 3:
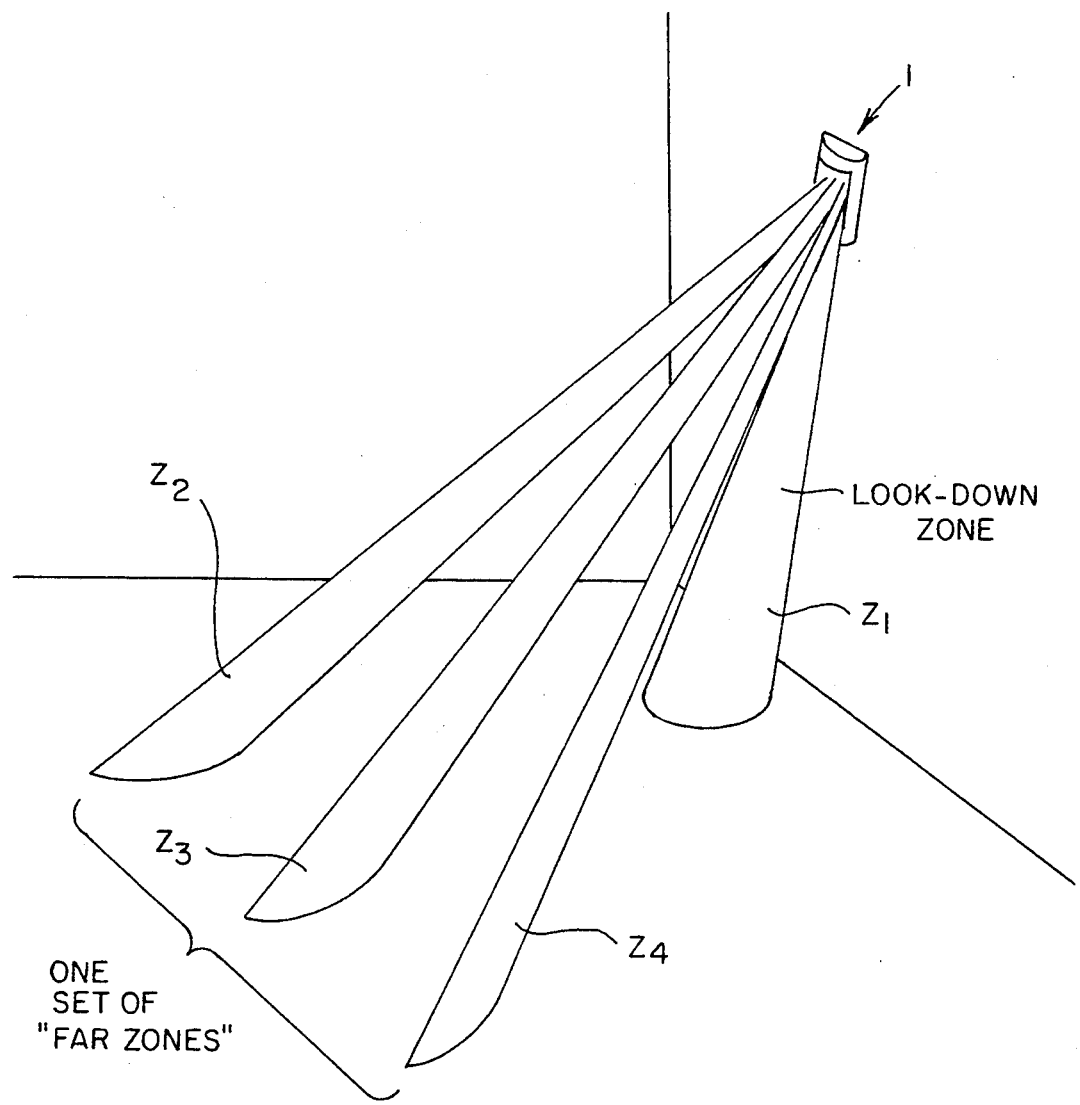
FIG. 3 illustrates the surveillance zones monitored by the intrusion detector of FIG. 2.

In the first embodiment of the invention, the window 4 defines a plurality of forward surveillance zones $Z_2, Z_3, Z_4$ and the optical element 10 defines a single look-down zone as 2, illustrated in FIG. 3.

Other embodiments of the invention may be made with a wide range of different configurations of the components.

Figure 4:
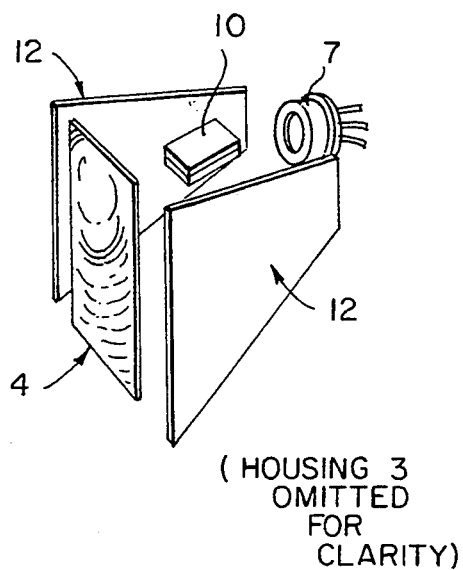
FIG. 4 illustrates diagrammatically shows a detector embodiment in which forward and side zones are produced using a front lens and angled side mirrors.
Figure 5:
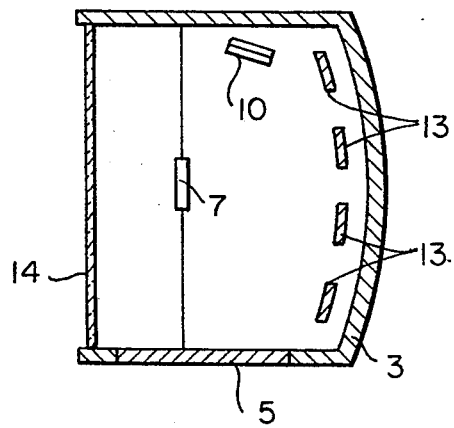
FIG. 5 shows a detector embodiment in which forward zones are produced using rear mirror segments.
Figure 6:
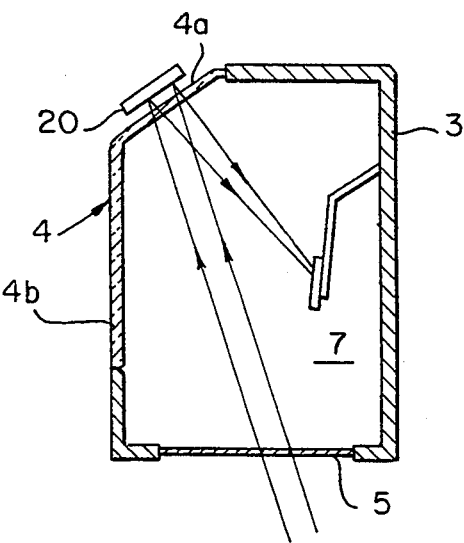
FIG. 6 shows an embodiment in which look-down zone(s) are produced using a mirror outside the detector housing in combination with a front lens.

FIGS. 4-6 illustrate a number of the different possible configurations. In these figures, elements which correspond to those of FIG. 2 have been given the same reference numerals.

FIG. 4 shows an embodiment in which a plurality of forward and side surveillance zones are created using a lens window 4 and angled planar side mirrors 12. A look-down zone or zones are created by an optical element 10 which is of the same type as that of FIG. 2 and operates in the same manner.

FIG. 5 shows an embodiment in which a plurality of forward surveillance zones are created by mirror segments 13 looking through a transparent window 14. A look-down zone or zones are created by an optical element 10 which is of the same type as that of FIG. 2 and operates in the same way.

FIG. 6 shows an embodiment in which a lens window 4 is used to create forward surveillance zones but also is used in conjunction with an angled mirror 20 to create one or more look-down zones. The Fresnel lens window has an upper portion 4a and lower portion 4b having different focal lengths. Mirror 20 is angled such that radiation from the look-down zone(s) is received through a screen 5 in the base of the detector, passes through the upper portion 4a of Fresnel lens window 4, is reflected from mirror 20, re-traverses the upper portion 4a of the Fresnel lens window 4 and is focussed onto a PIR 7.

The embodiments illustrated in FIGS. 2-6 all relate to intrusion detectors adapted for wall mounting and in which one or more look-down zones are created using an optical system including a lens through which received radiation travels twice. It is to be understood that the present invention may be embodied in detectors adapted to be mounted on a ceiling. Also, in wall or ceiling-mounted detectors embodying the present invention, forward, side and upward zones may be created using an optical system including a lens through which received radiation passes twice. In some embodiments, multiple optical systems each including a lens through which radiation passes twice may be used to create respective forward, side, upward and/or look-down zones.

The specific embodiments described above use Fresnel lenses but the invention may be embodied in devices using other types of lens.

The specific embodiment illustrated in FIG. 3 monitors one look-down zone and a plurality of forward zones which fan away from the detector at a common angle to the horizontal. However, the present invention is not to be limited to a particular number or disposition of zones to be monitored. In particular, a plurality of look-down zones may be monitored in addition to a plurality of forward zones and/or a plurality of side zones and/or upward zones. Furthermore the forward-/side/upward zones may include groups of zones fanning away from the detector at different angles to the horizontal.

It will be understood that certain features and subcombinations are of utility and may be employed without reference to other features and subcombinations. This is contemplated by and is within the scope of the appended claims. It is further obvious that various changes may be made in details within the scope of the claims without departing from the scope of the invention. It is therefore to be understood that the invention is not to be limited to the specific details shown and described.

What is claimed is:

1. Intrusion detection means for detecting the presence of an intruder within at least one zone (Z) contained in a space to be monitored, comprising:

(a) a housing (3) adapted for mounting on a fixed surface at least partially defining said space, said housing containing a chamber and at least one wall opening (5) affording access to said chamber;

(b) a sensing element (7) arranged in said chamber; and (c) optical means (10) arranged in said chamber for reflecting and focusing on said sensing element radiant energy produced by an intruder in said zone and introduced into said chamber via said opening, said optical means including:

(1) a mirror (10b) having a generally planar mirror surface; and (2) a generally planar lens (10b) arranged adjacent said mirror surface;

(3) said mirror and said lens being so arranged that said radiant energy successively passes through said lens, is reflected by said mirror surface, passes a second time through said lens, and is directed on said sensing element.

2. An intrusion detector as defined in claim 1, wherein said lens is arranged on said mirror surface.

3. An intrusion detector as defined in claim 1, wherein said mirror is formed of metal and said mirror surface comprises polished metal.

4. An intrusion detector as defined in claim 1, wherein said mirror is formed of a synthetic plastic material.

5. Apparatus as defined in claim 1, wherein said lens comprises at least one Fresnel lens.

6. Apparatus as defined in claim 1, wherein said housing includes a bottom wall containing said opening, thereby to receive radiant energy from a zone ($Z_1$) arranged below said housing; and further including:

(d) means (4) for directing onto said sensing element radiant energy produced by an intruder in at least one other zone ($Z_2$-$Z_4$) contained in said monitored space.

7. Apparatus as defined in claim 6, wherein said housing further includes a front wall containing a front aperture, said directing means comprising focusing window means (4) mounted in said front aperture.

8. Apparatus as defined in claim 7, wherein said focusing window means comprises at least one Fresnel lens.

9. Apparatus as defined in claim 8, and further wherein said sensing element comprises a passive infrared sensor.

10. An optical element adapted for use in an intrusion system for receiving and focusing on a sensing element radiant energy produced by an intruder in a zone (Z) of a space being monitored, comprising:

(a) a mirror (10b) having a planar mirror surface; and (b) a generally planar lens (10a) adjacent and parallel with said planar mirror surface, said optical element being adapted for arrangement at a position in which the radiant energy successively passes through said lens, is reflected from said mirror surface, returns through said lens, and impinges upon said sensing element.

11. Apparatus as defined in claim 10, and further wherein said mirror is formed of metal and said mirror surface comprises polished metal.

12. Apparatus as defined in claim 10, wherein said mirror is formed of synthetic plastic material.

13. Apparatus as defined in claim 10, wherein said lens comprises at least one Fresnel lens.

14. An intrusion detector for detecting presence of an intruder in one or more zones within a monitored space or movement of said intruder in or between said zones, the intrusion detector comprising:

a sensing element; and an optical system for reflecting and focussing radiation from said one or more zones onto the sensing element, the optical system comprising a substantially-planar mirror surface and a lens provided on said mirror surface, the optical element being arranged such that, in use, said radiation passes through the lens, is reflected from the mirror surface, returns through the lens and then impinges upon the sensing element.

15. The intrusion detector according to claim 14, wherein said lens comprises one or more Fresnel lenses.

16. The intrusion detector of claim 14, wherein the sensing element is a passive infrared sensor.

17. The intrusion detector according to claim 14, and comprising:

means for mounting the detector to a wall or ceiling; and means for directing radiation onto the sensing element from one or more further zones within said monitored space;

wherein said one or more zones are below the detector when mounted and said one or more further zones are front, side and/or upward zones.

* * * * *